United States Patent [19]

Dvorkin

[11] Patent Number: 5,771,259
[45] Date of Patent: Jun. 23, 1998

[54] LASER ELECTRODE COATING

[76] Inventor: Lev P. Dvorkin, P.O. Box 4244, Akko 24000, Israel

[21] Appl. No.: 745,777

[22] Filed: Nov. 8, 1996

[51] Int. Cl.⁶ .................................................. H01S 3/097
[52] U.S. Cl. ................................ 372/87; 372/81; 372/55; 372/109
[58] Field of Search ................................ 372/55, 59, 69, 372/70, 81, 85, 87, 98, 108, 109

[56] References Cited

U.S. PATENT DOCUMENTS

| | | | |
|---|---|---|---|
| 4,617,668 | 10/1986 | Rudko et al. | 372/59 |
| 4,639,926 | 1/1987 | Wang et al. | 372/87 |
| 4,651,324 | 3/1987 | Prein et al. | 372/59 |
| 4,756,000 | 7/1988 | Macken | 372/59 |
| 4,805,182 | 2/1989 | Laakmann | 372/82 |
| 4,853,940 | 8/1989 | Ford et al. | 372/87 |
| 4,875,218 | 10/1989 | Hongo et al. | 372/64 |
| 4,910,748 | 3/1990 | Ford et al. | 372/87 |
| 4,956,848 | 9/1990 | Terai et al. | 372/87 |
| 5,220,575 | 6/1993 | Bosch et al. | 372/87 |
| 5,274,661 | 12/1993 | von Gunten et al. | 372/99 |

FOREIGN PATENT DOCUMENTS

| | | | |
|---|---|---|---|
| 1256398 | 12/1971 | United Kingdom | 372/87 X |
| 2028571 | 3/1980 | United Kingdom | 372/87 X |
| 2107109 | 4/1983 | United Kingdom | 372/87 X |

*Primary Examiner*—Brian Healy
*Attorney, Agent, or Firm*—Richard C. Litman

[57] ABSTRACT

An improved laser electrode coating is disclosed for use in conjunction with $CO_2$ lasers. The coating utilizes dual layers of materials. The first layer is a dielectric material while the second layer is a catalyst. The combination of the two layers helps to reduce the electric field intensity within the amplification volume of the laser while improving the rate of recombination of disassociated $CO_2$. The coating increases both the power output and efficiency of a standard $CO_2$ laser.

10 Claims, 2 Drawing Sheets

LASER ELECTRODE COATING

BACKGROUND OF THE INVENTION

1. Field of the Invention

The present invention relates to lasers and more particularly to increasing the electro-optical efficiency of $CO_2$ lasers. The invention is specifically concerned with the use of a high quality dielectric coating to improve the efficiency of $CO_2$ lasers.

2. Description of the Related Art

Lasers have long been in use and since their introduction, many undesirable side effects have surfaced. It is well known that one such effect is the fact that the electrical discharge necessary to excite the laser gas also causes the $CO_2$ in the discharge to disassociate. The disassociation of the $CO_2$ can be represented according to a dual reaction:

$$CO_2 + e \rightarrow CO + O-$$

$$CO_2 + e \rightarrow CO + O + e$$

Over time, the reaction reaches equilibrium according to the reaction:

$$CO_2 \leftrightharpoons CO + \tfrac{1}{2} O_2$$

The problem with this reaction however, lies in the fact that equilibrium is not reached until over 60% of the $CO_2$ has disassociated. Meanwhile, the decomposition products reduce the power and gain of the laser. Furthermore, these products destabilize the electric discharge.

In terms of electron energy, the electrical discharge necessary to excite a laser typically ranges from 1–3 eV. As the volume of gas and electrons increases, the electrical discharge also increases. At the same time, more than 80% or the total input power required to excite the upper laser level $001°$ of $CO_2$ occurs in the electron energy region ranging from 0.3–0.7 eV. The exact percentage of input power is highly dependent on the mixture composition, particularly in the quantity of helium present in the mixture.

One solution to the disassociation process has been the use of a platinum catalyst heated to about 330° C. In order to accomplish this, a vacuum pump is used to continuously circulate the $CO_2$ gas mixture through a closed loop which includes: the electrical discharge section of the laser, the heated catalyst, and the vacuum pump. However, this process renders itself rather expensive. The process is also wasteful because about 10% of the gas must be disposed and replaced after each cycle. It therefore remains difficult to recombine disassociated $CO_2$ within the discharge cavity of a $CO_2$ laser without destabilizing the discharge or recirculating the gas.

The prior art discloses numerous attempts for improving the recombination of disassociated $CO_2$ within the discharge cavity of a laser. For example, U.S. Pat. No. 4,617,668 issued on Oct. 14, 1986 to Rudko et al. discloses a catalyst container which isolates the catalyst powder from the large electric fields present in the laser envelope. The container protects the catalyst medium from the shock wave produced by an electric discharge between a pair of electrodes which are used to excite the gain medium of the laser. The container also allows sufficient contact for catalysis to take place. The container is formed by a conductive solid housing and a conductive cover which is permeable to the gain medium and impervious to the catalyst medium. The container is placed within the main laser envelope in a region adjacent to the discharge region. The heat produced in the electrode by the electric discharge is transferred through the container to the catalyst medium in order to increase the recombination rate.

U.S. Pat. No. 4,639,926 issued on Jan. 27, 1987 to Wang et al. discloses a negative glow discharge hollow cathode device for generating laser radiation. The device includes a hollow cathode assembly which is substantially surrounded by an anode envelope. The anode envelope has body section and a pair of end section, each of which terminates in a radiation transmission member. The metal laser medium is enclosed in the vicinity of the perforations in the cathode so that the metal vapor can be readily introduced into the cathode central region. The anode to cathode discharge path is reduced by the use of an anode screen such that the glow discharge is directed into the cathode central region with a controlled discharge gap for optimum pressure. Metal vapor is released into the cathode by evaporation due to sputtering and heating of the discharge and confined therein by the cataphoretic pumping from the anode screen. An insulation sleeve adjacent the metal medium has one row of equally spaced slots and provides a uniform discharge gap and path along the cathode by aligning the slots with the perforated holes on the upper portion of the cathode.

U.S. Pat. No. 4,651,324 issued on Mar. 17, 1987 to Prein et al. discloses a method and apparatus for operating a $CO_2$ gas laser. The apparatus includes a number of bodies that are equipped with surface area-enlarging structures in the discharge chamber. The secondary chambers act as reservoirs for suitable catalysts. The secondary chambers also have a predetermined influence over the conditions of volume, pressure, and temperature. The inclusion of such secondary chambers make it possible to attain at least an approximate state of equilibrium. Thus, leading to uniformly good discharge and long life with high laser efficiency.

U.S. Pat. No. 4,756,000 issued on Jul. 5, 1988 to Macken discloses a discharge driven gold catalyst with application to a $CO_2$. The device includes gold as a catalyst to oxidize carbon monoxide (CO) and form $CO_2$ at ambient temperatures and is particularly useful to $CO_2$ lasers. In one $CO_2$ laser embodiment, gold is distributed on the walls of the discharge volume. The gold is divided to form electrically isolated islands in order to prevent interference with the discharge. Atomic Oxygen is provided to react with the CO on the gold catalyst. It is also possible to use the gold catalyst in a convective flow laser.

U.S. Pat. No. 5,274,661 issued on Dec. 28, 1993 to von Gunten et al. discloses a thin film dielectric coating for laser a resonator. The coating is deposited on a substrate which has two surfaces. The coating utilizes at least one absentee layer to form a high reflectance optical element with at least two regions of wavelengths in which the optic is substantially reflective. The two reflective regions are separated by a region in which the optic is substantially transmissive. Absorption and scattering is reduced over the stopbands by providing for uniform treatment of losses at desired wavelengths.

Great Britain Patent No. 1,256,398 published on Dec. 8, 1971 discloses a method and apparatus for operating a gas laser. The method includes recirculating the gas employed in the laser over a catalyst whose properties are such as to re associate a gas which has been disassociated during the use of the laser. The method may also include a step of changing the temperature of the gas leaving the laser to a temperature which is optimum for catalytic reassociation.

United Kingdom Patent No. 2,028,571 published on Mar. 5, 1980 discloses a carbon dioxide laser. The laser includes an envelope which contains an electrode structure, a reflective mirror, and a partially reflective mirror. A tin (IV) oxide-supported palladium or platinum catalyst is mounted inside the envelope in order to provide room temperature catalytic oxidation of carbon monoxide during and following discharge of the laser. The catalyst is contained in porous structures of alumina or silica.

United Kingdom Patent No. 2,107,109 published on Apr. 20, 1983 discloses a $CO_2$ laser which employs a catalyst to promote recombination of CO and oxygen. The catalyst is contained within a porous electrode which forms one of the laser discharge electrodes. The catalyst is then brought into contact with the gas by means of the pressure pulse caused by the electric discharge. The catalyst may be provided in the form of pellets contained within a wire mesh electrode.

None of the above inventions and patents, taken either singly or in combination, is seen to describe the instant invention as claimed.

SUMMARY OF THE INVENTION

Accordingly, it is a principal object of the invention to provide a coating for the electrodes of a laser apparatus.

It is another object of the invention to provide a coating which utilizes multiple layers of distinct material.

It is a further object of the invention to provide a coating which reduces $CO_2$ disassociation while improving overall efficiency.

It is an object of the invention to provide improved elements and arrangements thereof in an apparatus for the purposes described which is inexpensive, dependable and fully effective in accomplishing its intended purposes.

In accordance with the objects of the invention, a coating is provided for use on the electrodes of a laser apparatus. The coating is designed for use on such laser apparatus which further include a closed volume envelope containing a $CO_2$ gas mixture therein. The laser apparatus also includes a laser amplification volume for producing an electrical discharge through the $CO_2$ gas mixture. A first layer of dielectric material is disposed onto the surface of each electrode. The dielectric material is disposed such that it covers most or all of the working surface of-the electrode, i.e. the surfaces between which the $CO_2$ gas mixture must pass during excitation. The dielectric material is then coated with a layer of catalyst.

The dielectric material disposed on the electrode helps to decrease the electric field intensity in the amplification volume. At the same time, the dielectric material also decreases the average electron energy in the discharge so that the $CO_2$ molecules will be properly excited. The catalyst helps reduce the disassociation of $CO_2$ molecules. The catalyst accomplishes this by increasing the rate of recombination of the disassociated $CO_2$ molecules so that the rate of recombination approaches the rate of disassociation. In preferred embodiments of the invention, aluminum oxide is used as the dielectric coating while gold is used as the catalyst. The coating may be used in conjunction with either a DC or RF laser.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
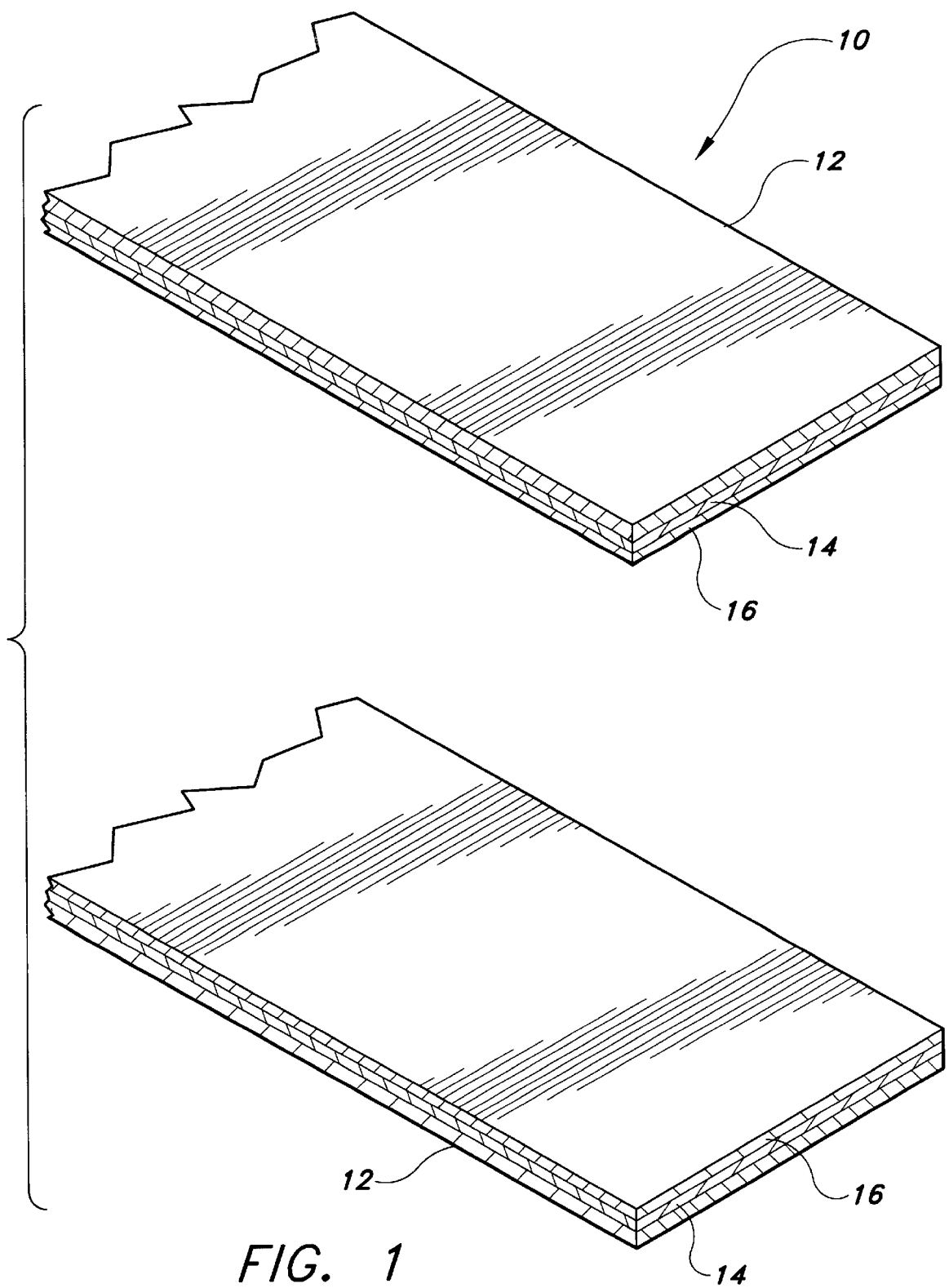
FIG. 1 is a perspective view of a pair of laser electrodes containing an improved coating according to the present invention.

With reference to the drawings and initially to FIG. 1, an electrode assembly 10 is shown for use in a laser apparatus. The electrode assembly includes a pair of electrodes 12 spaced apart by a predetermined distance for exciting $CO_2$ gas therebetween. As seen in the FIG. 1, the electrodes 12 are generally block shape. The electrodes 12 each include a multilayered coating thereon. The coating is designed for disposition on the electrodes 12 of a later apparatus which further includes a closed volume envelope containing a $CO_2$ gas mixture therein, as is well known in the art. The laser apparatus also includes a laser amplification volume for producing an electrical discharge through the $CO_2$ gas mixture.

A first layer of the coating is composed of a dielectric material 14. The dielectric material 14 is disposed such that it covers most or all of the working surface of the electrode 14, i.e. the surfaces between which the $CO_2$ gas mixture must pass during excitation. The dielectric material 14 disposed on the electrode helps to decrease the electric field intensity in the amplification volume. At the same time, the dielectric material 14 also decreases the average electron energy in the discharge so that the $CO_2$ molecules will be properly excited. The layer of dielectric material 14 should be relatively thin and may be applied using techniques which are well known in the art, such as anodizing. It has been determined by the inventor that a minimum thickness of 50 $\mu$m for the layer of dielectric material 14 is necessary for providing adequate electric strength. This thickness is sufficient for withstanding up to 2500 V, and discharges with input power ranging from 5–7 $W/cm^3$. In preferred embodiments of the invention, aluminum oxide is used as the dielectric material 14. However, there are numerous metal oxides which be used, so long as they possess a dielectric constant which is sufficiently high. There are several other factors which should be considered when selecting a metal oxide for use as a dielectric. The metal oxide should possess adequate electric strength and should not exhibit gassing in a vacuum environment. More importantly, the metal oxide should be inexpensive. In order to maximize the electric strength of the metal oxide, its purity and degree of homogeneity should be maximized. The coating may be used in conjunction with both DC and RF lasers.

The dielectric material 14 is then coated with a layer of catalyst 16. The catalyst 16 helps reduce the disassociation of $CO_2$ molecules in an indirect fashion. While the catalyst 16 takes no part in the chemical reaction, it reduces the overall effect of the disassociation process by increasing the rate of recombination of the disassociated $CO_2$ molecules so that the rate of recombination approaches the rate of disassociation, thereby resulting in an overall reaction which approaches equilibrium. In preferred embodiments of the invention, gold is used as the catalyst 16. Gold is preferred because it is capable of catalyzing the formation of $CO_2$ at ambient temperatures and inside the laser. A gold catalyst 16 also forms a very adherent film which will not flake off within the laser.

The combined layers of dielectric and catalyst 14, 16 provide significant improvements in the operation of $CO_2$ laser apparatus. It has been determined by the inventor that the output power of a 350 W $CO_2$ laser can be effectively increased to 900 W, while simultaneously increasing overall efficiency from 5.8% to 15%. Use of the dielectric layer 14 also allows the laser apparatus to use conventional $CO_2$ gas mixtures, as opposed to varying the mixture to include higher concentrations of helium. Furthermore, the dielectric layer 14 allows operation of the laser apparatus at higher pressures, while using the same $CO_2$ gas mixture. For example, a typical laser apparatus using such a dielectric layer 14 can operate with a $CO_2$ gas mixture at a 20% greater pressure level than normal.

Figure 2:
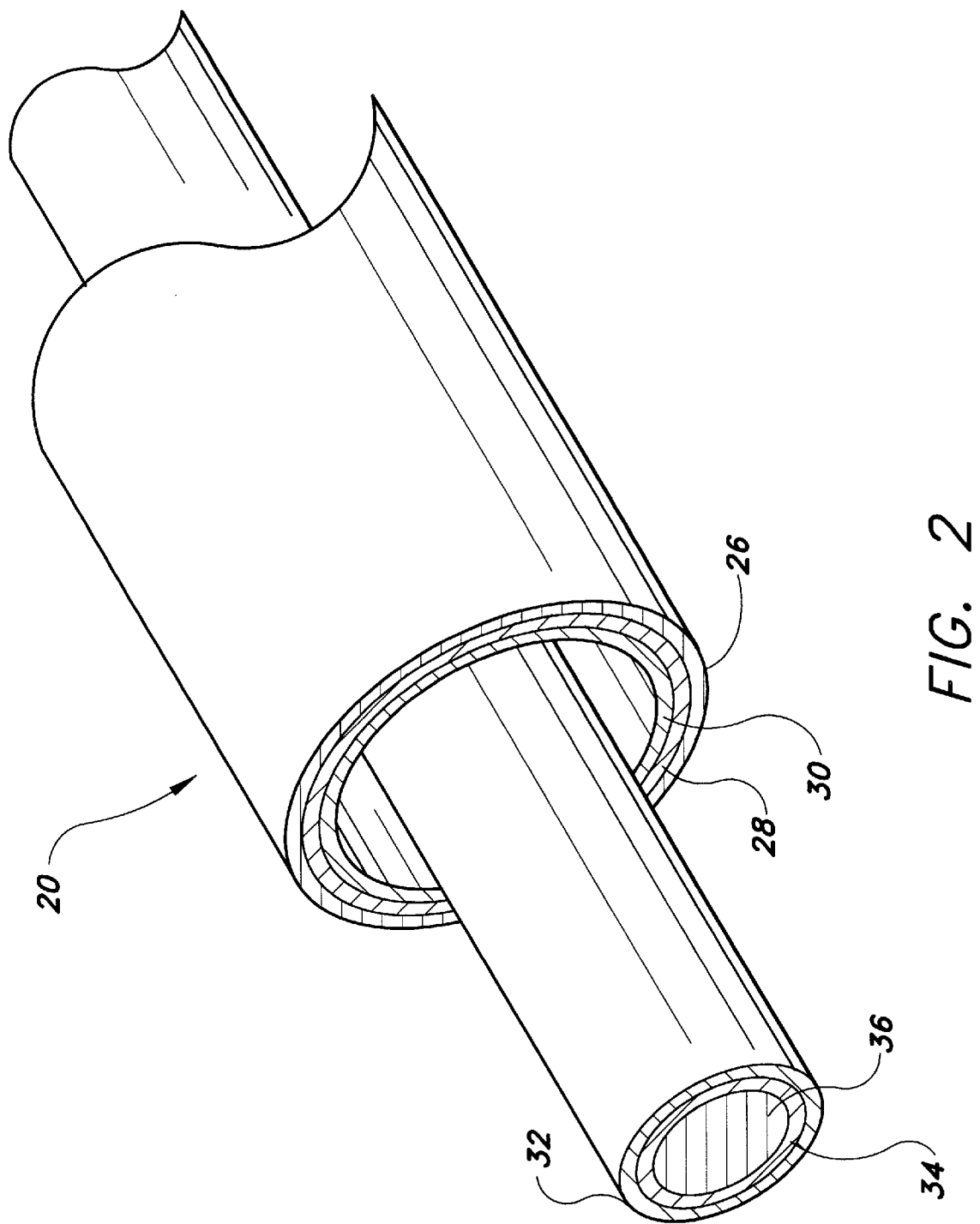
FIG. 2 is a perspective view of an alternative embodiment for the laser electrodes.

FIG. 2 illustrates an alternative embodiment for the electrode assembly 20. The electrode assembly 20 includes an inner and an outer electrode 26, 36. The inner electrode is cylindrically shaped and is solid. The outer electrode 26 is tubular such that the inner electrode 36 may be received therein while allowing sufficient space for the $CO_2$ gas mixture to pass. The electrodes 26, 36 each include a multilayered coating thereon and are designed for use with a laser apparatus which includes a closed volume envelope containing a $CO_2$ gas mixture therein, as is well known in the art. The laser apparatus also includes a laser amplification volume for producing an electrical discharge through the $CO_2$ gas mixture.

The first layer of the coating is composed of a dielectric material 34 such as aluminum oxide. The dielectric material 34 is disposed such that it covers most or all of the working surface of the electrode 34, i.e. the surfaces between which the $CO_2$ gas mixture must pass during excitation. The dielectric material 34 is then coated with a layer of catalyst 32 such as gold. The catalyst 32 helps reduce the disassociation of $CO_2$ molecules.

EXAMPLE

The effectiveness of a laser apparatus incorporating electrodes having a multi-layered coating has been tested in the following manner. A standard laser having a 7 mm gap between the electrodes was exposed to identical operating conditions with:

a—no coating of the electrodes
b—a typical oxide coating disposed on the electrodes
c—a "black" oxide coating disposed on the electrodes
d—a multilayered coating of aluminum oxide and gold disposed on the electrodes The laser module used is a commercial brand model ICCL-1600 which was used in conjunction with an "ETO" power supply and a "coherent" power meter. The discharge was allowed to pass through two cylindrical aluminum electrodes over a distance of 400 mm. The reflectivity of the front mirror is approximately 90% to 95%. A research grade gas mixture was selected which consists of $CO_2$, $N_2$, and He. The results of the experiment are summarized in table 1.

TABLE 1

| Pressure (tor) | Gas Mixture | Power In (KW) | Coating type | Power Out (W) | Efficiency (%) |
|---|---|---|---|---|---|
| 30 | 1:0.7:6.5 | 7 | a | 350 | 4.8 |
| 35 | 1:0.7:6.5 | 7 | b | 430 | 6.1 |
| 33 | 1:0.7:6.5 | 7 | c | 720 | 10.6 |
| 33 | 1:3:12 | 7 | d | 900 | 12.9 |

The inventor has determined the pressure and gas mixtures of each experiment to be the optimal combination for providing the greatest amount of output power and efficiency in conjunction with the selected coating. As seen from examination of the table, a multi-layered coating disposed on the electrodes of the laser provides over twice the power output and the efficiency of the same laser using standard non-coated electrodes. Furthermore, the laser with multi-layered coating on the electrodes shows a 20% increase in power and efficiency in comparison to the same laser using only a "black" oxide coating.

It is to be understood that the present invention is not limited to the sole embodiment described above, but encompasses any and all embodiments within the scope of the following claims.

I claim:

1. A coating for the electrodes of a $CO_2$ laser apparatus having a closed envelope containing a $CO_2$ laser gas mixture, and a laser amplification volume, said amplification volume including an electrical discharge through said $CO_2$ laser gas mixture, said discharge resulting in an electron energy distribution function having a predetermined range of average electron energy, the coating comprising:

a layer of dielectric material disposed on at least one surface of said electrode;

said layer of dielectric material being disposed so as to at least partially cover said at least one surface of said electrode, thereby decreasing the electric field intensity in the amplification volume and correspondingly decreasing the average electron energy in the discharge so as to effectively excite the upper laser level 001 of $CO_2$ molecules; and a layer of catalyst disposed on said layer of dielectric material, said layer of catalyst being capable of reducing the disassociation of $CO_2$ molecules in said discharge.

2. A coating as recited in claim 1 wherein said predetermined range of average electron energy is from 1 to 3 eV.

3. A coating as recited in claim 2 wherein said catalyst is gold.

4. A coating as recited in claim 3 wherein said dielectric coating is aluminum oxide.

5. A coating as recited in claim 4 wherein said dielectric coating is greater than 50 μm.

6. A method of passively controlling the electron energy distribution function in the discharge of a $CO_2$ laser apparatus comprising the steps:

a. obtaining the electron energy distribution function of the gas mixture in the discharge of the $CO_2$ laser;

b. coating the electrodes of the laser apparatus with a layer of dielectric material, such that the discharge of the laser occurs between electrode surfaces containing the dielectric coating; and c. applying a layer of catalyst upon the dielectric coating.

7. A method of passively controlling the electron energy distribution function in the discharge of a $CO_2$ laser apparatus as recited in claim 6 wherein said step of obtaining the electron energy distribution function is accomplished by electric DC discharge.

8. A method of passively controlling the electron energy distribution function in the discharge of a $CO_2$ laser apparatus as recited in claim 6 wherein said step of obtaining the electron energy distribution function is accomplished by RF discharge.

9. A method of passively controlling the electron energy distribution function in the discharge of a $CO_2$ laser apparatus as recited in claim 8 wherein said step of coating utilizes aluminum oxide.

10. A method of passively controlling the electron energy distribution function in the discharge of a $CO_2$ laser apparatus as recited in claim 9 wherein said step of applying utilizes gold as a catalyst.

* * * * *